Figure 1:
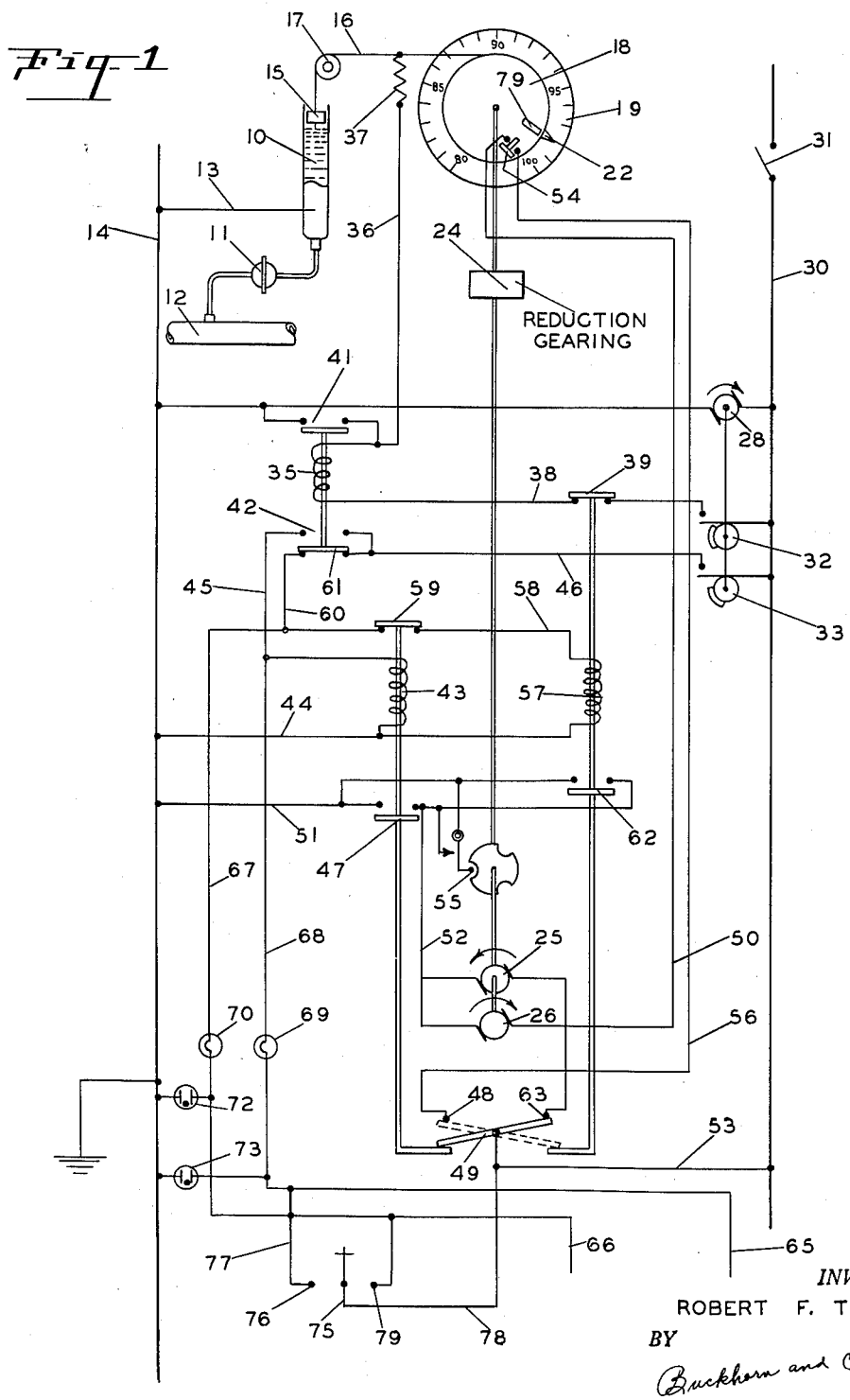

Sept. 27, 1955    R. F. TEESON    2,719,286
ELECTRICAL INDICATING APPARATUS
Filed April 26, 1952    2 Sheets-Sheet 1

INVENTOR.
ROBERT F. TEESON
BY
Buckhorn and Cheatham
ATTORNEYS

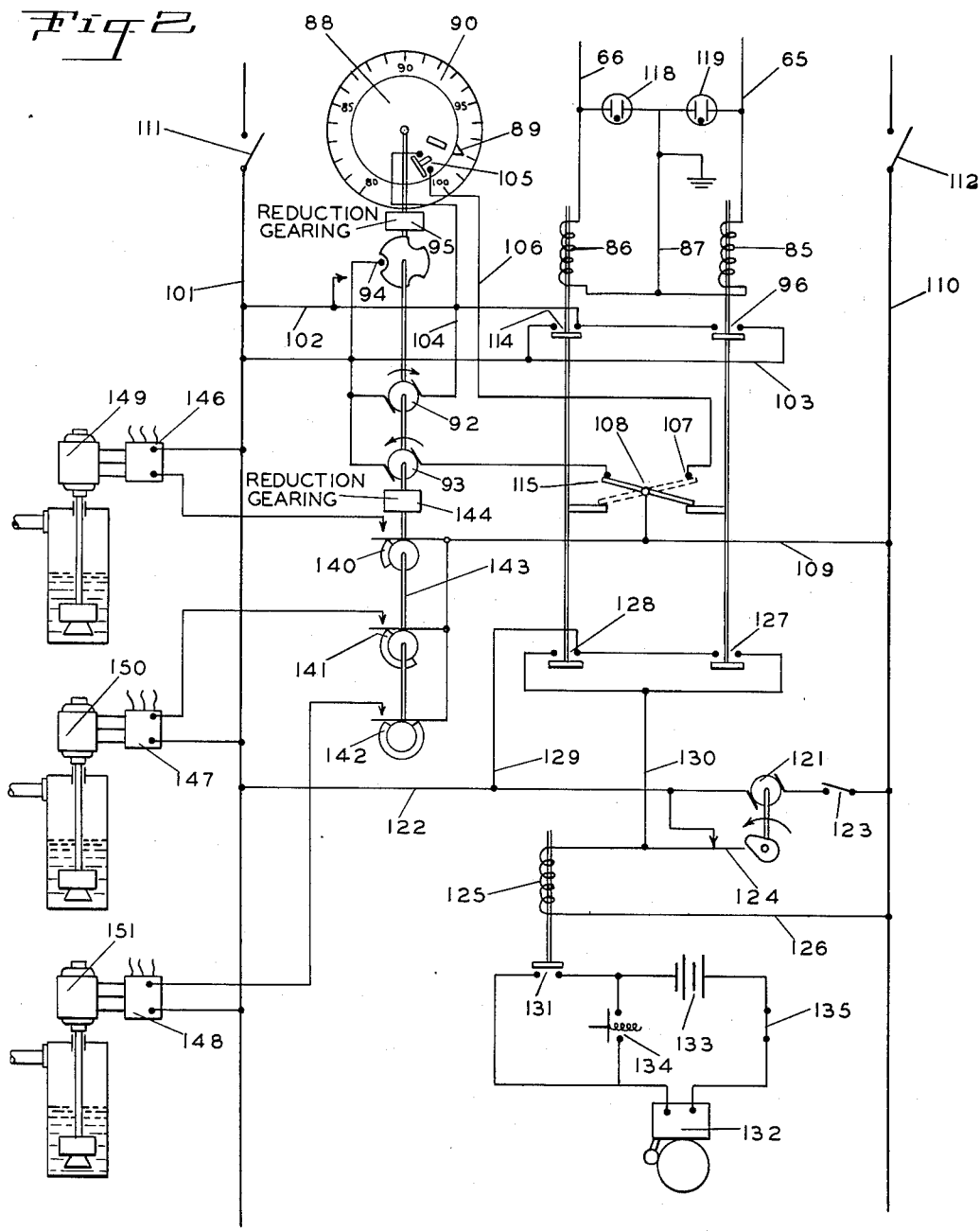

United States Patent Office 2,719,286
Patented Sept. 27, 1955

2,719,286
ELECTRICAL INDICATING APPARATUS

Robert F. Teeson, Washougal, Wash., assignor of one-half to John S. Shute, Portland, Oreg.

Application April 26, 1952, Serial No. 284,605

11 Claims. (Cl. 340—205)

The present invention relates to electrical indicating apparatus and more particularly to electrical apparatus for telegraphically transmitting information concerning a variable condition occurring at one point to one or more other remote points. While the invention is not to be necessarily so limited, it is particularly suitable for transmitting information concerning water level in a reservoir to one or more remote points at which the exact water level may be read at any time and with assurance that the signaling apparatus is functioning properly.

Considering, for example, a municipal water system, various agencies, such as the fire department as well as those in charge of the water system, are desirous of being advised at all time regarding the water level in the storage reservoir. With apparatus of the present invention, exact information concerning the elevation of the water level may be transmitted over leased telephone wires to any desired number of receiving stations, each of the receiving stations being provided with its own alarm for indicating failure of either the transmitter, the particular receiver or the connection therebetween.

It is a principal object of the present invention, therefore, to provide a new and improved automatic electrical condition indicating apparatus for telegraphically transmitting information concerning a variable condition to one or more remotely located receivers.

More specifically, it is an object of the present invention to provide a new and improved water level indicating system including means for transmitting indications of variations in water level to a remote point.

A still further object of the invention is to provide a remote controlled water level indicating system together with means for automatically controlling the operation of one or more pumps for supplying water to a reservoir.

A still further object of the present invention is to provide a new and improved alarm system particularly suitable for use in connection with electrical signaling apparatus and for indicating failure in the proper operation of such apparatus.

In accordance with the illustrated embodiment, I provide a water level indicating system comprising an interconnected signal transmitter and a signal receiver, the transmitter being adapted periodically to transmit electrical impulses to the receiver in accordance with either a rise or a fall in the reservoir water level, the receiver being provided with an indicator which is automatically adjusted by the incoming impulses in synchronism with the indicator at the transmitter, the receiver being furthermore provided with an electrical alarm arrangement which is synchronized with the periodic impulses sent out by the transmitter and in the event of failure of such impulses being received by the receiver or upon any failure of the connection between the transmitter and the receiver, or upon any power failure, an alarm is immediately given to warn the operator at the receiving station.

Further objects and advantages of the invention will become apparent as the description proceeds while the features of novelty will be pointed out with greater particularity in the appended claims.

In the drawings,

Fig. 1 is a schematic diagram illustrating the transmitter portion of the system of the present invention; and Fig. 2 is a schematic diagram illustrating the receiver portion of the system of the present invention.

The invention will be described with particular reference to a water level indicating system particularly suitable for use in connection with municipal water systems, although it will become apparent as the description proceeds that the apparatus of the present invention is applicable within a broader field of usage. For example, the invention may be utilized for transmitting information to remote receivers regarding physical variations in many different types of conditions.

Referring now to Fig. 1, I provide a condition responsive means having a movable element which in this instance consists of a mercury column 10 connected through a suitable pressure transmitting device 11 to a water main 12. The connection to the main 12 is made relatively closely adjacent the water reservoir in order that the top of the mercury column 10 will provide an accurate indication of the water level in the reservoir. The mercury column 10 forms a movable electrical contact which is either grounded or connected by the conductor 13 to the grounded conductor 14. A cooperating follower contact 15 is arranged within the tube containing the mercury column 10, the contact 15 being weighted with a stainless steel plug and supported upon the end of a flexible conductor 16 trained over a pulley 17. The flexible conductor 16 may, for example, be a silver chain and is connected at its opposite end to an indicator disc 18 rotatably mounted concentrically with a stationary dial 19. The disc 18 may be provided with a peripheral groove for receiving the flexible conductor or chain 16 or may be otherwise suitably connected to the same shaft supporting the disc 18, as may be desired.

Means are provided for periodically driving the disc 18 in either the clockwise or counterclockwise direction by small increments so as to maintain the follower contact 15 closely adjacent the upper surface of the mercury column so that the pointer 22 on the disc 18 will at all times give a reading upon the dial 19 corresponding to the height of the mercury column which, as previously explained, corresponds with the water level in the reservoir.

The disc 18 is connected through suitable reduction gearing 24 to a reversible electric motor which for convenience of illustration is shown as two separate motors 25 and 26, the motor 25 being connected for driving the disc 18 in the counterclockwise direction and motor 26 in the clockwise direction, as indicated by the arrows. Either the motor 25 or the motor 26 is energized at regular periodic intervals under the control of the timer motor 28. The motors 25, 26 and 28 are all of the synchronous type and motor 28 is connected directly across the alternating current supply conductors 14 and 30, the conductor 30 being provided with a master control switch 31 which will normally be closed. The motor 28 rotates at a speed of one revolution per minute and is provided with cam switches 32 and 33. For reasons which will be explained, switch 32 is set to close its contacts about one second ahead of closure of the contacts of switch 33. With the cam switches direct connected to the motor 28, the contacts thereof will close once each minute although, if desired, through the use of suitable gearing between the cam switches and motor 28 the rate of periodic closure of the contacts can be increased or decreased as desired. The length of time that the contacts of these cam switches are held closed may be adjusted as desired such as from five to eighteen seconds.

A control relay indicated generally at 35 has one of its winding terminals connected by conductor 36 and flexible pigtail connection 37 to the flexible conductor or chain 16, while the opposite terminal of the winding is connected through conductor 38, contacts 39 to the contacts of cam switch 32 to the supply line 30. Let us now assume that the follower contact 15 is in contact with the mercury column 10, then upon closure of the cam switch 32, an energizing circuit is created for the winding of the control relay 35 extending from conductor 14 through the conductor 13, mercury column 10, follower contact 15, flexible conductor 16 and through the conductors 37 and 36 previously described. Upon energization of the control relay 35, its holding contacts 41 will close to establish a by-pass circuit for the winding from conductor 36 directly to conductor 14, by-passing the follower contact 15 and mercury column 10. Contacts 42 of the control relay 35 are also closed whereupon upon closure of the contacts of the second cam switch 33, an energizing circuit will be created for the relay 43 which, for convenience, will hereinafter be referred to as the raise relay. This energizing circuit extends from the conductor 14 through the conductor 44, winding of raise relay 43, conductor 45, contacts 42, conductor 46 and through the closed contacts of the cam switch 33 to the other supply line 30. Upon energization of the raise relay 43 its contacts 47 are closed, the contacts 48 of the single pole, double throw switch 49 are closed to establish an energizing circuit for the clockwise rotating motor 26. This energizing circuit extends from the conductor 14 through the conductor 51, contacts 47, conductor 52, motor 26, conductor 50, limit switch 54, conductor 56, contacts 48 and conductor 53, to the other supply line 30.

Mounted upon the shaft connecting the motors 25 and 26 to the indicator disc 18 is a cam switch 55, the contacts of which close immediately upon commencement of rotation of motor 26, thereby establishing a by-pass around the contacts 47 so as to maintain motor 26 energized for twenty seconds or one-third of a revolution of the shaft supporting the cam. Before the contacts of the cam switch 55 open, cam switches 32 and 33 will both have opened, thereby de-energizing the relays 35 and 43 but it is pointed out that the double throw switch 49 remains in the closed position relative to contact 48 following drop-out of relay 43. This twenty-second operation of motor 26 drives the indicator disc 18 in the clockwise direction sufficient to raise the follower contact 15 out of engagement with the mercury column 10. Upon opening of the contacts of the cam switch 55, the motor 26 is stopped as well as the indicator disc 18. If at the next contact making interval of the timer cam switch 32 the water level in the reservoir has raised sufficiently to cause the mercury column 10 to move into contacting engagement with the follower contact 15 again, then the control relay 35 will be again energized as previously described, following which, upon closure of the cam switch 33, the raise relay 43 will again pick up to cause energization of the clockwise motor 26 rotating the disc 18 in the clockwise direction and again raise the follower contact 15 out of the mercury. The pointer 22 as previously described will indicate upon the dial 19 the new water level in the reservoir.

Now assume that the water level in the reservoir does not rise further so that upon the next closure of the time switch 32 the contact 15 is not in engagement with the mercury column 10. In such event, closure of the contacts of the cam switch 32 will not result in energization of the winding of the control relay 35 but instead, upon subsequent closure of the contacts of the cam switch 33, an energizing circuit will be created for the winding of the drop relay 57, which energizing circuit extends from the supply conductor 14 through conductor 44, the winding of drop relay 57, conductor 58, the closed contacts 59 of the raise relay 43, the closed contacts 61 of the control relay 35, conductor 46 and through the closed contacts of the cam switch 33 to the other supply conductor 30. Upon energization of the winding of the drop relay 57, its contacts 62 are closed and the other pair of contacts 63 of the double throw switch 49 are closed, thereby establishing an energizing circuit for the counterclockwise motor 25. This energizing circuit extends from the supply conductor 14 through the conductor 51, contacts 62, conductor 52, motor 25 and through contacts 63 and conductor 53 to the other side of the source of supply 30. Closure of the contacts of the cam switch 55 establishes a by-pass around the contacts 62 so as to maintain the motor 25 energized for a twenty-second period of time during which the relay 57 will drop out upon opening of the cam switch 33. In the meantime, the indicator disc 18 will be driven in the counterclockwise direction to permit the follower contact 15 to drop downwardly toward the mercury column 10. If, in the meantime, the mercury column 10 has dropped to such a point that the follower contact 15 still does not engage therewith, then upon the next closure of the cam switch 33 the counterclockwise motor 25 will again be energized in the manner just described to drop the follower contact 15 still further and which will be repeated by increments until such time as the follower contact does engage with the mercury column whereupon upon the next closure of the cam switch 32 the follower contact 15 will be raised in the manner initially described.

The drop relay 57 is provided with a pair of contacts 39 included in the circuit for the winding of the control relay 35 so as to preclude energization of the latter relay once the drop relay 57 has been energized and lifted.

Simultaneously with the periodic energization of the raise relay 43 or the drop relay 57, electrical impulses are transmitted selectively over the transmission lines 65 and 66 connected to the various receivers shown in Fig. 2. The transmission line 66 is connected to the conductor 60 through the conductor 67 in parallel with the winding of the drop relay 57 while the transmission line 65 is connected to the conductor 45 through conductor 68 in parallel with the winding of the raise relay 43. Connected in series relation with the conductors 67 and 68 are lamps 70 and 69, respectively, of such a size or wattage so that one or the other will glow slightly upon closure of the contacts of the time switch 33 so as to indicate that signal impulses are actually being transmitted to the transmission lines 65 or 66. In the event that either of the transmission lines 65 or 66 should become accidentally open circuited, then, of course, the corresponding lamp 69 or 70 will show no glow upon closure of the time switch 33, whereas on the other hand if either of the transmission lines 65 or 66 should become accidentally grounded, then the corresponding lamp 69 or 70 will glow brightly upon closure of the time switch 33, either of which conditions will indicate to the station operator that a fault has occurred requiring correction.

I also provide neon glow lamps 72 and 73 connected between conductors 67 and 68, respectively, and the grounded conductor 14 between the mazda lamps 70 and 69 and the transmission lines 65 and 66, which glow lamps will light upon closure of the contacts of the cam switch 33 and indicate energization of the relays 43 and 57 and also, incidentally, whether or not either of the lamps 69 or 70 are burned out.

A manually operable, single pole, double throw switch 75 is provided for effecting setting of the indicator disc 18 of the transmitter and for effecting simultaneous setting of corresponding discs of all of the connected receivers to an initial or start position. For example, upon movement of the blade of switch 75 into engagement with the contact 76, an energizing circuit is created for the winding of raise relay 43 extending from the conductor 14, conductor 44, winding of relay 43, conductor 68, lamp 69, conductor 77, switch 75, conductor 78, through conductor 53 to the other side of the source of supply 30. Upon raising of the relay 43, the clockwise rotating motor 26 will be energized so that the disc 18 will be continuously rotated in the clockwise direction until the stop 79 provided thereupon engages and opens the contacts of the limit switch 54, thereupon disrupting the energizing circuit for the motor 26. The stop 79 and limit switch 54 are so arranged relative to the disc 18 that the limit switch 54 will be actuated to the opened condition at the maximum indicating position of the disc 18 relative to the dial 19. Following opening of the limit switch 54, the manual switch 75 is moved to the opened circuit condition whereupon relay 43 will drop out and upon subsequent closure of the contacts of the time switch 33 the winding of the drop relay 53 will be energized in the manner previously described to effect energization of the counterclockwise motor 25, thereby causing incremental reverse movement of the disc 18 until such time as the follower contact 15 is brought into engagement with the surface of the mercury column. By movement of the manual switch in the opposite direction, or into engagement with the contact 79, the winding of the drop relay 57 may be energized should it be desired rapidly to restore the indicator disc 18 to some position corresponding approximately to the position of the follower contact 15 adjacent the surface of the mercury column 10. Closure of the manual switch 75 in either direction will result in bright illumination of the corresponding lamp 69 or 70 providing a clear indication to the operator, thereby minimizing the possibility that the manual switch 75 will accidentally be left closed.

The receiver portion of the system of the present invention which is illustrated schematically in Fig. 2 of the drawings includes an indicator substantially similar to the indicator 18, 19 incorporated in the transmitter portion of the system and also means selectively responsive to signals produced by the transmitter unit and transmitted over the signal transmission lines 66 and 65 for periodically readjusting the indicator simultaneously with and in the same direction as the periodic readjustments of the indicator of the transmitter unit. Thus the indicator of the receiver unit is adjusted in synchronism with the adjustment of the indicator in the transmitter unit so that the receiver indicator will at all times accurately register the position of the water level in the reservoir or variations in the condition influencing the condition responsive device connected to the transmitter indicator.

Referring now to Fig. 2, the receiver mechanism includes a rotatable disc 88 provided with a pointer 89, the disc 88 being mounted concentrically upon a graduated dial 90 and being connected for rotation in either the clockwise or counterclockwise direction by a reversible synchronous motor which for convenient reference purposes is illustrated as consisting of two separate motor sections, a clockwise rotating motor 92 and a counterclockwise rotating motor 93. This reversible motor and indicator mechanism is substantially identical to that previously described and as incorporated in the transmitter apparatus, the motor shaft being further provided with a cam switch 94 similar to the cam switch 55 adapted to be rotated at a speed of one revolution per minute and with the contacts thereof retained in closed circuit position by the cam for intervals of twenty seconds each as in the case of the contacts of the cam switch 55. The motor 92, 93 is also connected to the disc 88 through suitable reduction gearing 95 so that the disc 88 is driven at the same rotational speed as the disc 18 of the transmitter unit.

The transmission lines 65 and 66 are connected to the winding terminals of the raise relay 85 and drop relay 86, respectively, the opposite winding terminals of these relays being grounded through the conductor 87.

Considering now the situation initially discussed above in connection with the description of the transmitter unit during which the clockwise rotating motor section 26 was energized to cause clockwise rotation of the indicator disc 18 upon closure of the cam switch contacts 33, and simultaneously with the energization of the winding of raise relay 43, an electrical impulse was transmitted through conductor 68 over the transmission line 65 to cause energization of the receiver raise relay 85. Energization of the winding of the raise relay 85 results in closure of the contacts 96 whereupon the clockwise rotating motor 92 is energized. This energizing circuit extends from one side of the source of supply 101 through the conductor 102, closed contacts 96, conductor 103, motor 92, conductor 104, closed contacts of the limit switch 105 mounted adjacent the indicator disc 88, conductor 106, closed contacts 107 of the single pole, double throw switch 108 and through conductor 109 to the other side of the source of supply 110. It is to be understood, of course, that the master control switches 111 and 112 provided in the conductors 101 and 110, respectively, are first moved to the closed position in order to effect energization of the conductors 101 and 110.

Immediately following initial rotation of the motor 92, the contacts of the cam switch 94 are closed, thereby establishing a by-pass circuit around the relay contacts 96 so that the motor section 92 will be retained energized for an interval of twenty seconds, following which the contacts of the cam switch 94 will open to de-energize the motor 92, it being understood that the contacts 96 of the raise relay 85 will, in the meantime, have opened following cessation of the impulse transmitted over conductor 65.

Each time an impulse is transmitted over conductor 65 the preceding operation is repeated so that the indicator disc 88 will keep step with the clockwise rotational movement of the indicator disc 18 of the transmitter.

Now assume that an impulse is transmitted over the transmission line 66 simultaneously with the energization of the drop relay 57 of the transmitter. Such an impulse will result in the energization of the winding of the drop relay 86 of the receiver which will pick up to close its contacts 114 and shift the single pole, double throw switch 108 to the position opposite that which it previously occupied and so as to close a circuit to contact 115. This operation completes an energizing circuit for the counterclockwise motor section 93 extending from the conductor 101, through conductor 102, closed contacts 114, to the motor 93, through the closed contacts 115 of the switch 108 and through conductor 109 to the other supply line 110. Upon rotation of the motor 93, the contacts of the cam switch 94 will close to establish a by-pass circuit around the contacts 114, thereby maintaining the motor section 93 energized for a twenty-second interval of time to rotate the indicator disc 88 in the counterclockwise direction by an amount identical to the counterclockwise rotation of the indicator disc 18 of the transmitter unit. With each impulse transmitted over the transmission line 66, the motor 93 will be energized as described.

Neon glow tubes 118 and 119 are connected between the transmission lines 66 and 65, respectively, and ground, and will glow each time that an electrical impulse comes in over either of the transmission lines 66 or 65 respectively. If neither of these tubes is momentarily illuminated once each minute, the observer can tell quickly that a failure has occurred either in connection with the transmitter unit or that a failure has occurred in the corresponding transmission line or both.

Aside from the warning indication provided by the glow lamps 118 and 119, I also incorporate an audible alarm system in connection with the receiver, which will now be described. A synchronous motor 121 is connected directly across the supply lines 101 and 110 by conductor 122, switch 123 being provided in the series circuit for de-energizing the motor 121 such as during repair of either the transmitter or receiver when it might be desirable to silence the audible alarm. The motor 121 is provided with a cam switch 124 which is normally closed and opened for only a short interval of time beginning after the commencement of an electrical impulse flowing through either of the transmission lines 65 or 66 and closing again before the transmitted impulses have stopped. This, of course, requires that the synchronous motor 121 be closely synchronized with the motor 28 so that the contacts of the cam switch 124 are momentarily opened only during the period that contacts of the cam switch 33 associated with the motor 28 are closed. As previously explained, the contacts of the cam switch 33 are normally closed for a period between five seconds and eighteen seconds so that the period during which the contacts of the cam switch 124 are opened is somewhat shorter. The alarm portion of the system includes a relay 125 which is normally energized through conductor 122, the normally closed contacts of the cam switch 124 and conductor 126 to the supply line 110. Normally opened contacts 127 and 128 are provided upon the raise relay 85 and the drop relay 86, respectively, these contacts being connected in parallel by conductors 129 and 130 forming a by-pass around the contacts of the cam switch 124. If an impulse is properly transmitted over either of the transmission lines 65 or 66, then either the contacts 127 or contacts 128 will be closed during the interval that the contacts 124 of the cam switch are opened by motor 121 whereupon the winding of relay 125 will be maintained continuously energized.

Assume, however, that an impulse does not come into the receiver over either of the transmission lines 65 or 66 at the end of each minute, then neither of the contacts 127 nor 128 will close so that upon opening of the contacts of the cam switch 124, the relay 125 will drop to close its contacts 131, thereby establishing an energizing circuit for the alarm such as bell 132. The alarm bell is preferably energized from battery 133, the condition of the battery being subject to test by closure of the manually operable push button switch 134 by-passing the contacts 131, the battery circuit being further provided with a manual control switch 135.

It is to be understood that the alarm system forms no essential part of the indicating portion of the receiver and may be omitted therefrom should it be unnecessary or undesirable. This may be particularly true in case a plurality of receivers are connected to the transmission lines 65 and 66 in which case it might be desirable to provide the alarm portion only in connection with certain selected ones of the receivers. The alarm system as illustrated and described, however, will provide a positive indication in the event of a power failure at either the transmitter or receiver stations or any other failure which might cause any signal from the transmitter to reach the receiver.

Following the repair of any failure and during which one or more of the indicator discs might drop out of step, resetting of all of the indicator discs may be accomplished by the operation of the manual control switch 75 as previously described. By moving the switch so as to close with contact 76 the transmission line 65 will be continuously energized which will, in turn, result in the continuous energization of the clockwise motor section 92 associated with all of the receiver units whereby the disc 88 of the receiver indicator will be advanced to its limit position whereupon the contacts of the limit switch 105 will be opened, thereby stopping the motor section 92.

The present indicator system was described with particular reference to a municipal water system. In the event that water is supplied to the reservoir by means of one or more pumps, the operation of such pumps may be conveniently controlled by the apparatus of the present invention and either by the transmitter unit or the receiver unit as desired. Inasmuch as both of the indicator discs 18 and 88 provide an accurate indication of the water level within the reservoir, cam switches may be provided upon either of the shafts driving the indicator discs for controlling the energization of pump motors. With particular reference to Fig. 2, a plurality of cam switches 140, 141 and 142 are shown provided upon the shaft 143 which shaft is connected to the reversible motor 92, 93 through a suitable reduction gearing 144 whereby the shaft 143 will be rotated at exactly the same rate as the indicator disc 88. The contacts of the switches 140, 141 and 142 are connected to controllers 146, 147 and 148, respectively, for controlling the energization of pump motors 149, 150 and 151, respectively. The cams associated with the cam switches may be so arranged that the pump motors will be thrown into operation in a staggered sequence depending upon the water demand. In the position of the cams as shown, all of the pump motors are de-energized for the reason that the pointer 89 of the indicator disc 88 indicates that the reservoir is substantially full. The cam 142 may be so set that the pump motor 151 will be energized at a water level of 95 feet whereas if the water level should drop to some value such as 90 feet, then the contacts of the cam switch 141 will close to throw the pump motor 150 into operation. If the water level should continue to drop to a still lower level such as 85 feet, then the contacts of the cam switch 140 will close so as to throw the pump motor 149 into operation along with the remaining pumps. As the reservoir begins to fill, then the pump motors will be de-energized in reverse order.

As previously explained, the pump motor control does not form any essential part of the present invention but may, if desired, be incorporated in one of the receiver units or even in the transmitter unit as may be convenient. Moreover, in certain cities the different pumping stations may be scattered over a relatively wide area and with a receiver unit as described installed at each pumping station, then the control of the pump motors at that particular station may be incorporated in that particular receiver unit and with the cam switch so adjusted with relation to pump motor cam control switches of other receiver stations that all of the various pumps will be thrown into operation in a predetermined desired sequence similar to that described above.

Having described the invention in what is considered to be a preferred embodiment thereof, it is desired that it be understood that the specific details are given merely by way of illustration and that the apparatus is not to be necessarily so limited. In the appended claims, I desire to cover all such modifications and variations as fall within the true spirit and scope of the invention and as defined.

I claim:

1. In an apparatus of the class described comprising a signal transmitter and a signal receiver, said transmitter including a condition responsive device having an element movable in accordance with condition variations, a pair of transmission lines connecting said transmitter and said receiver, said transmitter including means responsive to movements of said element for sending an electrical impulse at regular periodic intervals over either of said lines said receiver including an indicator responsive to said impulses, said receiver unit including signal means for indicating failure of reception by said receiver of any periodic impulse over either of said lines.

2. In an apparatus of the class described comprising a signal transmitter and a signal receiver, a pair of transmission lines connecting said transmitter and said receiver, said transmitter including a condition responsive device having an element movable in accordance with increasing or decreasing values of said condition, an indicator operatively connected to said device for indicating the relative position of said element, means operatively connected to said device for producing an electrical impulse at regular periodic intervals and transmitting the same over a selected one of said lines, said receiver including an indicator, said receiver including means responsive to an impulse transmitted over one of said lines to adjust said receiver indicator in one direction and means responsive to an impulse transmitted over the other of said lines to adjust said receiver indicator in the opposite direction.

3. In an apparatus of the class described comprising a signal transmitter and a signal receiver, a pair of transmission lines connecting said transmitter and said receiver, said transmitter including a condition responsive device having an element movable in accordance with increasing or decreasing values of said condition, an indicator operatively connected to said device for indicating the relative position of said element, means operatively connected to said device for producing at regular periodic intervals an electrical impulse corresponding to any change in the relative position of said element, said receiver unit including an indicator, said receiver including means selectively responsive to any impulse correspondingly adjusting said receiver indicator whereby said receiver indicator will be adjusted in synchronism with said transmitter indicator.

4. In an apparatus of the class described, the combination comprising a signal transmitter unit and a signal receiver unit, each of said units including an indicator, a pair of transmission lines connecting said units, the said transmitter unit including a condition responsive device having a movable element, a follower mounted cooperatively adjacent said movable element and connected to said transmitter indicator, said transmitter unit including means for maintaining said follower in close proximity to said movable element, said transmitter unit including means for sending electrical impulses over a selective one of said lines, said receiver unit including means selectively responsive to said impulses for selectively readjusting the position of said receiver indicator, both of said units including visual means connected to both of said lines for indicating transmission of impulses thereover.

5. In an apparatus of the class described, the combination comprising a signal transmitter unit and a signal receiver unit, each of said units including an indicator, a pair of transmission lines connecting said units, said transmitter unit including a condition responsive device having a movable element, a follower element mounted cooperatively adjacent said movable element and connected to said transmitter indicator, said transmitter unit including means for readjusting said transmitter indicator at periodic intervals for maintaining said follower element in close proximity to said movable element, said transmitter unit including means for sending electrical impulses over a selected one of said lines at said periodic intervals, said receiver unit including means selectively responsive to said impulses for selectively readjusting the position of said receiver indicator, said receiver unit including signaling means responsive to failure of reception of electrical impulses at said periodic intervals.

6. In an apparatus of the class described, a combination comprising a signal transmitter unit and a signal receiver unit, each of said units including an indicator, a pair of transmission lines interconnecting said units, said transmitter unit including a condition responsive device operatively connected to said transmitter indicator for causing adjustment thereof at regular periodic intervals in accordance with condition variations, said transmitter unit including means for sending electrical impulses over one of said lines to said receiver unit in accordance with movements of said transmitter indicator in one direction, said receiver unit including means responsive to said last mentioned impulses for causing a similar adjustment of said receiver indicator in the corresponding direction, said transmitter unit including means for sending electrical impulses over the other of said lines in accordance with movements of said transmitter indicator in the opposite direction, said receiver unit including means responsive to said last mentioned impulses to cause a similar opposite adjustment of said receiver indicator.

7. In an apparatus of the class described, a signal transmitter and a signal receiver, and a pair of transmission lines connecting said transmitter and said receiver, said transmitter including a mercury column adapted to be operatively connected to a liquid reservoir and responsive to changes in the elevation of liquid therewithin, a contact element suspended cooperatively over the surface of the mercury in said column, adjustment means operative at regular periodic intervals for adjusting the position of said contact element in response to changes in the level of said mercury, means in said transmitter for causing transmission of a signal over one of said lines during the interval of lowering of said contact element, means in said transmitter for causing transmission of signals over the other of said lines during the interval of raising of said contact element, and indicator means in said receiver selectively responsive to said signals for indicating the relative position of said contact element.

8. In an apparatus of the class described comprising a signal transmitter and a signal receiver, said transmitter including a condition responsive device having an element movable in accordance with condition variations, a pair of transmission lines connecting said transmitter and said receiver, said transmitter including means responsive to movements of said element for sending an electrical impulse at regular periodic intervals over either of said lines, said receiver unit including signal means for indicating failure of reception by said receiver of any periodic impulse over either of said lines, said signal means including a timing means synchronized with said impulse sending means for effecting operation of said signal means.

9. In a water level indicating apparatus, the combination comprising a signal transmitter unit and a signal receiver unit, each of said units including an indicator, a pair of transmission lines connecting said units, said transmitter unit including a water level indicating device having a movable element and a follower element, said follower element being mounted cooperatively adjacent said movable element and connected to said transmitter indicator, said transmitter unit including means for readjusting said transmitter indicator at regular periodic intervals for maintaining said follower element in close proximity to said movable element, said transmitter unit including means for sending electrical impulses over a selected one of said lines at said periodic intervals, said receiver unit including means selectively responsive to said impulses for selectively readjusting the position of said receiver indicator, said receiver unit including signaling means responsive to failure of reception of electrical impulses at said periodic intervals.

10. In an apparatus of the class described comprising a signal transmitter unit and a signal receiver unit, a pair of transmission lines connecting said transmitter and said receiver, said transmitter unit including a condition responsive device and means responsive to said device to initiate an electrical impulse in accordance with condition variations over one of said lines, said transmission and receiver units each having an indicator adapted to advance or regress in accordance with said electrical impulses, and means for effecting resetting of said indicators to identical starting positions.

11. In an apparatus of the class described comprising a signal transmitter unit and a signal receiver unit, a pair of transmission lines connecting said transmitter and said receiver, said transmitter unit including a condition responsive device and means responsive to said device to initiate an electrical impulse in accordance with condition variations over one of said lines, said transmission and receiver units each having an indicator adapted to advance or regress in accordance with said electrical impulses, and means for effecting resetting of said indicators to identical positions, said resetting means including means to continually energize one of said transmission lines whereby each of said indicators will move toward an identical limit position, and means on each of said indicators for effecting stopping of the corresponding indicator at said limit position.

References Cited in the file of this patent

UNITED STATES PATENTS

| Number | Name | Date |
| --- | --- | --- |
| 828,570 | Regan | Aug. 14, 1906 |
| 1,565,904 | Burkholder | Dec. 15, 1925 |
| 1,664,265 | Rieber | Mar. 27, 1928 |
| 2,445,200 | Wolfe | July 13, 1948 |
| 2,466,099 | Hansen | Apr. 5, 1949 |
| 2,496,366 | Adelson | Feb. 7, 1950 |
| 2,567,823 | Needham | Sept. 11, 1951 |
| 2,586,427 | Hagenau | Feb. 19, 1952 |
| 2,604,527 | Buehler | July 22, 1952 |